United States Patent [19]

Millman

[11] Patent Number: 4,627,910

[45] Date of Patent: * Dec. 9, 1986

[54] HYDROCARBON CONVERSION PROCESS

[75] Inventor: William S. Millman, Brea, Calif.

[73] Assignee: Union Oil Company of California, Los Angeles, Calif.

[*] Notice: The portion of the term of this patent subsequent to Jan. 10, 2001 has been disclaimed.

[21] Appl. No.: 543,245

[22] Filed: Oct. 19, 1983

Related U.S. Application Data

[62] Division of Ser. No. 491,882, May 5, 1983, Pat. No. 4,425,221, which is a division of Ser. No. 287,022, Jul. 27, 1981, Pat. No. 4,392,985.

[51] Int. Cl.$^4$ .................... C10G 11/04; C10G 45/08; C10G 49/04

[52] U.S. Cl. .................... 208/112; 208/120; 208/123; 208/136; 208/143; 208/251 H; 208/254 H; 208/111

[58] Field of Search .................... 208/136, 143, 251 H, 208/254 H, 111, 120, 112, 123, 124

[56] References Cited

U.S. PATENT DOCUMENTS

| | | | |
|---|---|---|---|
| Re. 29,948 | 3/1979 | Dwyer et al. | 208/110 |
| 3,232,887 | 2/1966 | Pessimisis | 502/74 |
| 3,287,280 | 11/1966 | Colgan et al. | 502/211 |
| 3,617,509 | 11/1971 | Hensley, Jr. | 208/111 |
| 3,749,663 | 7/1973 | Mickelson | 502/211 |
| 3,749,664 | 7/1973 | Mickelson | 502/211 |
| 3,755,147 | 8/1973 | Michelson | 208/112 |
| 3,755,148 | 8/1973 | Mickelson | 502/211 |
| 3,755,150 | 8/1973 | Mickelson | 502/211 |
| 3,755,196 | 8/1973 | Mickelson | 502/211 |
| 3,776,839 | 12/1973 | Lodeur | 502/242 |
| 3,804,741 | 4/1974 | Robson | 208/110 |
| 3,840,472 | 10/1974 | Colgan et al. | 502/211 |
| 3,894,056 | 7/1975 | Bertus et al. | 502/211 |
| 4,152,251 | 5/1979 | Michelson | 208/254 |
| 4,202,798 | 5/1980 | Johnson et al. | 502/211 |
| 4,255,282 | 3/1981 | Simpson | 502/211 |
| 4,260,520 | 4/1981 | Erperbach et al. | 502/211 |
| 4,483,764 | 11/1984 | Hensley, Jr. et al. | 208/111 |

OTHER PUBLICATIONS

The Condensed Chemical Dictionary, 10th ed., Van Nostraan Reinhold Co., pp. 579-580, 886, 887.

Primary Examiner—Donald L. Walton
Assistant Examiner—O. Chaudhuri
Attorney, Agent, or Firm—Dean Sandford; Gregory F. Wirzbicki; Alan H. Thompson

[57] ABSTRACT

A hydrocarbon conversion catalyst containing cobalt and a Group VIB metal and having a substantially uniform cross-sectional phosphorus distribution is prepared by impregnating support particles with a solution containing dissolved cobalt, phosphorus, and at least 17 weight percent of Group VIB metal components, calculated as the trioxides, having a pH of less than 1.2, and characterized by an extinction coefficient in the ultraviolet spectrum of about $0.7 \times 10^4$ to about $1.8 \times 10^4$ liters/cm·moles of Group VIB metal, followed by aging, drying and calcining. The catalyst is useful for promoting a number of hydrocarbon conversion reactions, particularly those involving hydrogenative desulfurization.

37 Claims, No Drawings

HYDROCARBON CONVERSION PROCESS

This application is a division of application Ser. No. 491,882, filed May 5, 1983, now U.S. Pat. No. 4,425,221 which is a division of application Ser. No. 287,022, filed July 27, 1981, now U.S. Pat. No. 4,392,985.

BACKGROUND OF THE INVENTION

1. Field of the Invention

This invention relates to hydrocarbon conversion catalysts, such as those utilized to catalyze the reaction of hydrogen with organo-nitro, organo-metallic and particularly organo-sulfur compounds. More particularly, this invention is directed to catalysts useful for the hydrodesulfurization of hydrocarbons and to a method for preparing such catalysts employing a novel aqueous impregnating solution. The invention is especially directed to catalysts of high overall desulfurization activity and stability.

2. Description of the Prior Art

In the refining of hydrocarbons, it is often necessary to convert a hydrocarbon fraction to different forms. In one such conversion, hydrodesulfurization, the concentration of sulfur components in a hydrocarbon feedstock is reduced so that, when the product is eventually combusted, less sulfur oxides will form, and hence will present fewer pollution problems. In addition, it is often desirable to remove sulfur from hydrocarbon fractions in order to protect catalysts used in subsequent processing steps which are rapidly deactivated in the presence of sulfur, and to otherwise render such sulfur-containing hydrocarbon fractions more useful.

The reaction of organo-sulfur compounds contained in hydrocarbon feedstocks with hydrogen is known to be accelerated in the presence of a catalyst comprising a Group VIB metal, a Group VIII metal, and phosphorus supported on a refractory inorganic oxide. Compositions containing these and other elements have been previously investigated. For example, hydrodesulfurization catalysts comprising a Group VIII metal, particularly cobalt or nickel, a Group VIB metal, particularly molybdenum or tungsten, and phosphorus on an alumina or silica-stabilized alumina base have been disclosed in U.S. Pat. Nos. 3,755,150, 3,755,196, and 3,840,472. Such catalysts are very often prepared by impregnation, that is, the deposition of the active components on the support base by contact thereof with an aqueous solution containing the active components in dissolved form. U.S. Pat. No. 3,755,196, for example, describes impregnating media and methods using stabilized impregnating solutions for preparing catalysts consisting of molybdenum plus nickel or cobalt salts with phosphoric acid dissolved in an aqueous medium. U.S. Pat. No. 3,840,472 discloses another process for preparing a stable impregnating solution that includes dissolving a nickel or cobalt compound with an acid of phosphorus followed by subsequent dissolution of molybdic oxide.

Although conventional catalysts are active and stable for hydrodesulfurization, catalysts of yet higher activities and stabilities are still being sought. Increasing the activity of a catalyst increases the rate at which a chemical reaction proceeds under given conditions, and increasing the stability of a catalyst increases its resistance to deactivation, that is, the useful life of the catalyst is extended. In general, as the activity of a catalyst is increased, the conditions required to produce a given end product, such as a hydrocarbon of given sulfur content, become more mild. Milder conditions require less energy to achieve the desired product, and catalyst life is extended such as due to lower coke formation.

It is believed in the prior art that greater active component uniformity in the catalytic particles improves activity. The formation of a more evenly distributed layer of the active components, such as the metals, and their oxides, or sulfides, in sufficient concentration through the entire surface area of the catalytic support provides more efficient utilization of the entire catalytic contacting surface at milder conditions for longer periods of time.

Accordingly, it is an object of this invention to provide hydrocarbon conversion catalysts having a relatively evenly distributed layer of active components and to provide a method for using such catalysts for the desulfurization of hydrocarbons. Another object is to provide a method for producing hydrocarbon conversion catalysts of improved desulfurization activity and stability in comparison to conventional catalysts of similar composition. Still another object is to provide hydrocarbon conversion catalysts of improved desulfurization activity and stability in comparison to conventional catalysts of similar composition. These and other objects and advantages of the invention will be apparent from the following description.

SUMMARY OF THE INVENTION

Briefly, the invention provides for hydrocarbon conversion catalysts and for a method of preparing such catalysts employing a novel impregnating solution. In one embodiment, a catalyst composite comprising a Group VIB metal component, a cobalt metal component, and a phosphorus component on a retractory oxide has a cross-sectionally uniform center-to-edge phosphorus distribution, usually with a center-to-edge ratio in the range of about 2.0 to about 0.5. In another embodiment, catalysts of the present invention are prepared by impregnating support particles with a solution containing dissolved cobalt, phosphorus, and at least 17 weight percent of Group VIB metal components, having a pH less than 1.2, and characterized by a maximum extinction coefficient in the ultraviolet spectrum of about $0.7 \times 10^4$ to about $1.8 \times 10^4$ liters/cm-moles of Group VIB metal, followed by aging, drying, and calcining. In yet another embodiment, catalysts are prepared with an aqueous impregnating solution having a pH less than 1.2 and containing dissolved cobalt, phosphorus, at least 17 weight percent of a Group VIB metal, and ammonium ions in a molar concentration greater than 1.5.

Catalysts prepared in accordance with the invention are useful for promoting the conversion of hydrocarbons, particularly by hydrodesulfurization. The catalysts prepared with the impregnating solution exhibit high activity and improved stability when utilized to promote high conversions of organo-sulfur compounds to hydrogen sulfide.

DETAILED DESCRIPTION OF THE INVENTION

Hydrocarbon conversion catalysts of the present invention are prepared with impregnating solutions having a pH below about 1.2. The solutions contain dissolved cobalt, phosphorus, and Group VIB metal components, with the preferred Group VIB metals being molybdenum or tungsten, with molybdenum being most preferred. The weight ratio of the cobalt component (as cobalt oxide) to the Group VIB components (as the trioxide) in the solution is usually in the range of about 0.1 to about 0.4. Preferably, the solution contains one or more Group VIB components in a total concentration of at least 17 weight percent, calculated as the metal trioxides, at least about 1 weight percent of cobalt components, calculated as cobalt oxide, and at least about 0.5 weight percent of phosphorus components, calculated as phosphorus.

The impregnating solution of the invention may be most conveniently prepared by dissolving into water a Group VIB metal compound and an acid of phosphorus, such as metaphosphoric acid, pyrophosphoric acid, phosphorous acid, but preferably orthophosphoric acid, or a phosphoric acid precursor, that is a phosphorus-containing compound capable of forming a compound containing at least one acidic hydrogen atom when in the presence of water, such as a phosphorus oxide, phosphorus, or the like. The phosphoric acid, or precursor, is added in amounts such that the resulting solution contains phosphorus to Group VIB metal compound in a weight ratio between about 0.01 and 0.5, and most preferably 0.05 to 0.16, phosphorus to Group VIB metal, expressed as the trioxide. The phosphoric acid may be conveniently used to increase the solubility of the added Group VIB metal compound and increase the stability of the impregnating solution. A cobalt compound, soluble in acidic aqueous solution, such as cobalt oxide, cobalt carbonate, but preferably cobalt nitrate, is then added in a desired amount. Usually, after addition of a cobalt compound such as cobalt nitrate, the pH of the solution may drop below about 1.0, but if the solution remains above about 1.2, an acid is added, such as dilute nitric acid, dilute sulfuric acid, dilute hydrochloric acid, but most preferably phosphoric acid so as to lower the pH preferably below about 1.2, and more preferably below about 1.0, and most preferably below about 0.9. Preferably, the final solution contains between 1 and 10 weight percent of cobalt components (as cobalt oxide) and more preferably less than 6 weight percent.

A variety of Group VIB metal components may be utilized to produce a stable impregnating solution of the invention. In general, all Group VIB metal compounds soluble in aqueous media, particularly those of molybdenum or tungsten, may be utilized. The oxides of molybdenum (e.g., molybdenum trioxide) are useful, as are many salts containing molybdenum, such as cobalt molybdate. Particularly useful are salts containing both a Group VIB metal and ammonium ion, such as ammonium dimolybdate, ammonium phosphomolybdate, and most preferably ammonium heptamolybdate. Impregnating solutions containing ammonium ions are highly preferred, especially when the ammonium ion is present in a concentration exceeding 1.5 moles per liter, and preferably exceeding 1.9 moles per liter.

One unusual feature of the invention is that, although the impregnating solution contains a relatively large proportion of Group VIB metal components, the solution is stable, the dissolved components remaining in solution for a time period sufficient to impregnate the support particles without the formation of crystalline deposits. It has been disclosed in U.S. Pat. No. 3,755,150 that impregnating solutions containing dissolved phosphorus, Group VIII metal, and more than 17 weight percent of molybdenum should be maintained "as close as possible" to a pH of 1.5 in order to avoid the formation of crystalline deposits and crystalline aggregations on the support surface, with deviations from 1.5 towards either 1.2 to 1.8 decreasing the stability of the solution. In the present invention, however, no crystalline deposits or crystalline aggregations resulting in a lessening in activity of the final catalyst have been detected, even when the pH is below about 1.2 and when both the impregnating solution and the final catalyst contain more than 17 weight percent of Group VIB metal components, calculated as the trioxides. Moreover, it has been found that when cobalt is chosen as the Group VIII metal, the stability of a solution having a pH below about 1.2 is significantly greater than a comparative solution having a pH of 1.5, especially when the Group VIB metal components are present in a concentration above 17 weight percent and more especially still, above 20 weight percent. Furthermore, as the pH of the impregnating solution is progressively decreased below 1.2, the stability of the solution increases. Accordingly, it is a specific embodiment of the invention to prepare a highly active hydrocarbon conversion catalyst by a method including the step of impregnating support particles with a solution having a pH less than about 1.2 and preferably less than about 1.0, and containing cobalt components and Group VIB metal components, the latter in a concentration greater than about 17 weight percent, preferably more than about 20 weight percent, and most preferably in the range from about 25 weight percent calculated as the trioxides, with the impregnation being such that essentially no crystalline deposits or aggregates form in the support. (In general, the crystalline deposits or aggregations can be avoided with freshly prepared impregnating solutions or with solutions that are essentially free of precipitating components.)

Impregnating solutions of the present invention have a characteristic absorbance of ultraviolet light as determined by standard spectrophotometrical techniques. In one such technique employing a spectrophotometer, light having a wavelength in the ultraviolet region is allowed to irradiate a sample of the impregnating solution of given Group VIB metal concentration held in a container of given thickness, and the amount of light transmitted through the same is then measured by a suitable detector, such as a photocell. The intensity of the light transmitted through the impregnating solution is compared with the light intensity when no solution is present, and the absorbance of the solution is then calculated by reference to:

$$A = \log(I_o/I) = abc$$

which is based upon the Bouguer-Lambert-Beer's law. As applied to the impregnating solution of the invention, $A$ is the maximum absorbance in the ultraviolet wavelength range. $I_o$ is the intensity of the light beam with no sample present, $I$ is the intensity of the light beam after passing through the sample, $a$ is a constant called the absorbtivity or extinction coefficient, $b$ is the thickness (or light path distance) of the sample solution, and $c$ is the concentration of Group VIB metal in the sample.

Spectra of the impregnating solution of the invention exhibit maximum absorbance of ultraviolet light in the wave length range of about 200 to 250 nanometers, preferably between 200 and 220 nanometers, and most preferably between 200 and 210 nanometers. The maximum absorbance of a sample solution of one centimeter thickness is generally greater than 1.3 and preferably between 1.3 and 2.3 when the solution is diluted such that the molar concentration of the Group VIB metal (calculated as the metal) is in the range of about $0.7 \times 10^{-4}$ to about $3.3 \times 10^{-4}$. The impregnating solution of the invention is characterized by a maximum extinction coefficient in the range of about $0.7 \times 10^4$ to about $1.8 \times 10^4$ liters/centimeters.moles of Group VIB metal as calculated from the Bouguer-Lambert-Beer's law equation:

$$a = A/(bc)$$

The extinction coefficient is preferably in the range of about $1.10 \times 10^4$ to about $1.60 \times 10^4$ liters/centimeters·moles of Group VIB metal, and most preferably in the range of about $1.10 \times 10^4$ to about $1.40 \times 10^4$.

Although the invention is not limited to any particular theory of operation, it is believed that a cobalt-phospho-molybdenum complex or a phospho-molybdenum complex is formed during preparation of the impregnating solution of the invention. The complex may be responsible for the characteristic absorbance of ultraviolet light at wavelengths in the range of 200 to 250 nanometers. The complex also is believed to impart high deactivation resistance to the finished catalysts when used to promote hydrocarbon conversion reactions, particularly the desulfurization of gas oils and the like.

Several conventional methods may be employed to impregnate the catalytic support particles with the solution of this invention. One such method, commonly referred to as the spray impregnation technique, involves spraying the support with the impregnating solution. Another impregnating method, often used to maintain relatively low concentrations of active components in this solution, is the circulation or multi-dip procedure wherein the active support is repeatedly contacted with the impregnating solution with or without intermittent drying. In this technique, the phosphorus component combines with the support particles more rapidly than does the Group VIB metal component, which in turn combines more rapidly than the cobalt component, and consequently the concentration and concentration ratios of the active components in the solution need to be changed with the relative rates of adsorption. Another method, the pore volume or pore saturation technique, is preferred. This method involves dipping the catalyst support into an impregnating solution having a volume usually sufficient to just fill the pores of the support and, on occasion, may be up to about 10 percent excess. The concentrations of active components in the solution during impregnation by this technique may be somewhat higher than those utilized in other methods because the ratios of active components in the final catalyst are determined directly by solution composition, selective adsorption effects not being a factor.

The impregnating solution of the invention may be utilized with any of a number of support particles. Support particles suitable for use herein include such refractory oxides as silica, magnesia, silica-magnesia, zirconia, silicazirconia, etc. Other suitable supports include natural and synthetic crystalline and amorphous aluminosilicates and crystalline silicas, e.g., silicalite. Preferred refractory oxides comprise aluminum and are usually selected from the group consisting of alumina and silica-alumina. Gamma alumina is the most highly preferred support.

The foregoing refractory oxides are usually prepared in the form of shaped particulates by methods well-known in the art, with the preferred method being to extrude an inorganic refractory oxide gel, such as peptized alumina gel, through a die having openings therein of the desired size and shape, after which the extruded matter is cut into extrudates of desired length. Preferred refractory oxide particles are of cylindrical shape having a cross-sectional diameter of 1/32 to ⅛ inch and a length of 1/32 to ¾ inch. Also preferred are refractory oxide particles having lengths between 1/32 and ¾ inch and having cross-sectional shapes resembling that of a three-leaf clover, as shown, for example, in FIGS. 8 and 8A of U.S. Pat. No. 4,028,227. Preferred clover-shaped particles are such that each "leaf" of the cross-section is defined by about a 270° arc of a circle having a diameter between about 0.02 and 0.04 inches.

Refractory oxide support particles prepared in the form of extrudates are generally pre-calcined prior to impregnation, especially if gamma alumina is the desired support material. Temperatures above about 900° F. are required to convert the alumina gel to gamma alumina. Usually, temperatures above about 1100° F. are utilized to effect this transformation, with holding periods of one to three hours generally being utilized to produce preferred gamma alumina extrudates.

The amounts of active components retained on the support particles will depend largely on the pore volume and surface area of the support particle. In general, the most preferred support, gamma alumina as well as silica-stabilized alumina, will have a pore volume after pre-calcining between 0.6 and about 1.4 cc/gram and an sorption capacity sufficient to retain the desired amount of solution in a single step. The pore volume of alumina is preferably between 0.65 and 0.9 cc/gram and most preferably between 0.68 and about 0.8 cc/gram as measured by standard mercury and helium differential density tests for pore volume. Support particles ordinarily have a surface area of 100 to about 280 m²/gm, preferably 150 to about 250 m²/gm, and most preferably 170 to about 250 m²/gm.

In the preferred embodiment, the support particles are "pre-wetted" prior to impregnation. The support particles may be "pre-wet" by contact with water after pre-calcination such that at least 10 percent of the pore volume, and most preferably at least 30 percent, but not more than 50 percent of the pore volume, is filled with water. When the pores of the support particles are thus partially filled with water by this "pre-wet" method, the resulting catalyst will usually be found to have greater activity and stability for promoting hydocarbon conversion reactions than if prepared without "pre-wetting."

In order to improve homogeneity of the active components on the support, contact time (aging) of the support particles with the impregnating solution is short. It is preferred to age the impregnated particles in the impregnating solution for at least about twenty minutes but usually less than about two hours before dying and calcining. However, the particles may be aged for upward to eight hours or longer. Substantially even distribution of active components in the support results from aging the support particles under mild conditions, i.e., 50° F. to about 100° F., while utilizing the pore saturation method of impregnation.

After impregnation, the support is dried and calcined to produce a catalyst containing the active components in desired proportions. The impregnated support particles may be dried gradually or rapidly and may be calcined at a temperature of at least 750° F., and preferably from about 1,100° to about 1,400° F., so as to convert the active metals to their oxide forms. When calcining support particles impregnated with a solution of the invention containing cobalt nitrate, flowing air is usually passed at a sufficient rate over the support particles to remove the nitrogen dioxide ($NO_2$) produced during the exothermic reaction associated with nitrate decomposition.

The final composition of the catalyst of the invention contains a Group VIB metal component, a cobalt metal component, and a phosphorus component on a refractory oxide. The final composition generally contains between about 5 and about 50 weight percent Group VIB metal components, calculated as the trioxides, and from about 1 to about 10 weight percent cobalt components, calculated as cobalt oxide. Preferably, the final composition contains greater than 17 weight percent, and most preferably between about 17 and about 30 weight percent Group VIB metal components and preferably less than 4 weight percent, and most preferably between about 1 and 3.8 weight percent cobalt components. The final composition of the catalyst usually contains at least one weight percent phosphorus, calculated as phosphorus, and preferably contains between about 1 and about 10 weight percent phosphorus.

After calcination, the oxided catalyst is generally presulfided so as to convert the active metal components to the corresponding sulfides. Usually the catalysts are presulfided prior to use by contact with a stream of sulfiding gas, such as hydrogen sulfide-hydrogen mixtures containing about 1 to 10 volume percent of hydrogen sulfide, at temperatures between about 200° and 1,200° F. Although presulfiding of the catalyst is preferred, it is not essential, as the catalyst may be sulfided in a short time by contact with a sulfur-containing feedstock processed at conditions disclosed herein.

One unusual feature of the catalyst of the invention is that the distribution of phosphorus in the catalyst is relatively uniform. This uniformity of phosphorus distribution can be determined analytically by a scanning electron microscope (SEM). Conventional principles of X-ray energy spectrometry (XES) are applied to SEM measurements to produce line scans of phosphorus content across the longest cross-section of the finished catalyst particles of the invention. These line scans for particles of the catalyst of the invention reveal that the center-to-edge ratios of phosphorus content lies in the range of about 0.5 to about 2.0 (Note: A center-to-edge ratio of 1.0 represents optimum uniform distribution over the longest cross-section of the catalytic particles.) These line scan examinations of the catalyst particles of the invention reveal that the distribution of phosphorus in the catalyst of the invention is far more uniform than those of catalysts impregnated with conventional solutions which usually exhibit above a 2.5 center-to-edge ratio. It is believed that activity and/or stability improvement of the catalyst of the invention for promoting hydrocarbon conversion reactions is attributable in part to uniform distribution of phosphorus in the catalyst.

As illustrated by the examples hereinafter set forth, a catalyst prepared with the impregnating solution of the invention is highly stable and active for promoting hydrocarbon conversion reactions. The more uniform phosphorus distribution on the support particles and the formation of different complexes in the impregnation solution are believed responsible at least in part for the improved activity and greater deactivation resistance of the catalyst of the invention as compared to conventional catalysts. Impregnation of support particles with the solution of the invention does not result in segregation of active components into different crystalline species on the support, and as a consequence, the deposition of active components in less-active, heterogeneously dispersed forms is minimized.

The catalyst of this invention may be employed in any of several hydrocarbon conversion processes wherein catalytic composites of cobalt and Group VIB metals with phosphorus are known to be catalytically effective, such as hydrogenation, dehydrogenation, desulfurization, hydrodesulfurization, oxidation, denitrogenation, demetallization, isomerization, cracking, hydrocracking, reforming, and the like. The catalyst of the invention may be used to refine any of a great number of hydrocarbon liquids, such as crude petroleum oils, crude synthetic oils such as shale oils, and fractions thereof. Preferably, however, the hydrocarbon feedstock will boil primarily above about 100°, and more preferably from about 100° F. to about 1,300° F., with the most preferred feedstock being gas oils boiling in the range of about 600° to 1,100° F. Other feedstocks include lubricating oils, waxes, vacuum and residua fractions, kerosene, solvent naphthas, fuel oils, diesel fuels, jet fuels, heavy naphthas, light naphthas, cycle oils from cracking operations, coker distillates, cracked gasoline, decant oils, and the like.

The conditions employed to refine the foregoing feedstocks will vary widely depending upon the process in which the catalyst is used and the nature of the feedstock. Usually the feedstock is contacted with the catalyst in the presence of super-atmospheric pressures in the range from about 20 psig to about 6,000 psig. When utilized with the catalyst to promote a hydrocarbon conversion reaction in one of the above-mentioned processes, hydrogen is usually added at a rate in the range of about 25 SCF/bbl to about 20,000 SCF/bbl. Contact times usually correspond to a liquid hourly space velocity (LHSV) in excess of about 0.05, but generally in the range of about 0.1 and about 15.

The catalyst of the invention is particularly effective for desulfurization reactions. Hydrocarbon feedstocks often contain sulfur, largely in the form of organosulfur compounds, such as mercaptans, disulfides, and the like. These organo-sulfur compounds are usually present in a total concentration greater than 5 ppmw, but more often in a concentration in excess of 100 ppmw, and often in a concentration greater than 0.1 weight percent, calculated as sulfur.

In order to desulfurize a hydrocarbon feedstock with the catalyst of the present invention, hydrogenative desulfurization conditions are utilized. Usually, the feedstock is contacted with the catalyst at elevated temperatures and in the presence of super-atmospheric hydrogen partial pressures. In commercial practice, temperatures at least about 400° F., usually at about 400° F. to about 950° F., preferably 500° F. to 800° F., and most preferably about 600° F. to 750° F., are employed. The pressure required to operate the process of the invention is usually above 200 psig but no more than about 5,000 psig, preferably between about 400 and 2,000 psig, and most preferably between about 500 and 1,500 psig. Hydrogen is usually added at a rate of at least 50 scf/bbl, generally at least 100 scf/bbl, and preferably between about 400 and about 10,000 scf/bbl. Contact time usually corresponds to a LHSV in excess of about 0.1, and usually in excess of about 0.3, and most commonly within the range of about 0.3 to about 10. For example, commercial desulfurization conditions often include temperatures of 650° F. to about 800° F., hydrogen partial pressures of about 500 psig to about 2,000 psig, and a space velocity in the range of 0.3 to 4.0 LHSV. The foregoing conditions are correlated to reduce the sulfur content as desired, usually by at least 50 percent in a single pass but preferably by at least about 85 percent in a single pass.

The catalyst of the invention exhibits high activity for an extremely long period of time. The catalyst may be utilized to effect substantially complete desulfurization or at least a significant degree of desulfurization in a single pass of the feedstock with the catalyst. As demonstrated in the examples hereinafter, over 93 percent removal of sulfur may be accomplished in a single pass, with the catalyst remaining highly stable, deactivating at a rate less than 0.5° F. per day.

The following examples are provided to illustrate the improved performance obtainable with the catalyst of the invention; they are not intended to limit the scope of the invention which is defined by the claims.

EXAMPLE I

Impregnating Solutions Nos. 1 through 9 are prepared, five in accordance with the invention (Solution Nos. 1, 2, 3, 4 and 9), and each is diluted so as to be analyzed with an ultraviolet spectrophotometer having an absorbance sensitivity from 0 to about 2.12 for a sample having a thickness of one centimeter. The solutions are prepared as follows:

Solution No. 1 (AHM)

Ammonium heptamolybdate (72 grams) is placed in a beaker containing 100 ml of water and is partially dissolved by stirring for one minute. Undissolved ammonium heptamolybdate is dissolved by slowly stirring into the resulting solution about 19 ml of 85 percent phosphoric acid ($H_3PO_4$). Forty-two (42) grams of cobalt nitrate ($Co(NO_3)_2.6H_2O$) is then dissolved in the resulting solution. After dissolution of the cobalt nitrate, an impregnant solution having a volume of 175 ml and a pH of about 0.97 is obtained.

Solution No. 2 (AHM)

The solution of the invention is prepared in the same manner as Solution No. 1 except about 21 ml of 85 percent phosphoric acid ($H_3PO_4$) is added and after dissolution of the cobalt nitrate a pH of about 0.9 is obtained.

Solution No. 3 (AHM)

The solution of the invention is prepared in the same manner as Solution No. 1 except about 35 ml of 85 percent phosphoric acid ($H_3PO_4$) is added and after dissolution of the cobalt nitrate a pH of about 0.5 is obtained.

Solution No. 4 (AHM-high pH)

The solution is prepared in the same manner as Solution No. 1, however, only about 15 ml of 85 percent phosphoric acid ($H_3PO_4$) is added and after dissolution of the cobalt nitrate a pH of about 1.14 is obtained.

Solution No. 5 (ACID)

This solution is prepared as an example of a solution utilized in making a prior art catalyst taught in U.S. Pat. No. 3,840,472. Twenty-four ml of 85 percent $H_3PO_4$ is slowly stirred into 108 ml of water in a beaker, the resulting solution is brought to a boil, and 63.88 grams of molybdenum trioxide ($MoO_3$) is stirred vigorously into the boiling solution. Then 21.88 grams of cobalt carbonate ($CoCO_3$) is added, with liberation of carbon dioxide ($CO_2$) during dissolution. A red translucent solution is obtained after heating and mixing for about two hours. After dissolution of the cobalt carbonate, an impregnant solution having a volume of 175 ml and a pH of 0.9 is obtained.

Solution No. 6 (ACID)

This solution is prepared in the same manner as Solution No. 5 except 58.3 ml of $H_3PO_4$ is added and the pH obtained is 0.5.

Solution No. 7 (ACID)

This solution is prepared in the same manner as Solutions No. 5 except 16 ml of $H_3PO_4$ is added and the pH obtained is 1.14.

Solution No. 8 (AHM-no P)

This solution is prepared in a similar manner as Solutions Nos. 1, 2, 3 and 4 except no $H_3PO_4$ is added, thereby resulting in the dissolution of 43.55 grams of ammonium heptamolybdate and 46.20 grams of cobalt nitrate. The pH of the solution obtained is 4.48.

Solution No. 9 (ACID+$NH_4NO_3$)

This solution is prepared in the same manner as Solution No. 5; however, 26.39 grams of ammonium nitrate ($NH_4NO_3$) is stirred into the resulting solution and a final pH of about 0.38 is obtained.

Data derived from the ultraviolet spectrum, the Bouguer-Lambert-Beer's law, pH determinations, and molar concentrations are summarized in Table I:

TABLE I

| Solution No. & Designation | Extinct Coeff. liters cm · moles of Mo | pH | Moles Co liter | Moles P liter | Moles Mo liter | Max | A |
|---|---|---|---|---|---|---|---|
| 1. AHM | $1.25 \times 10^4$ | 0.97 | $5.8 \times 10^{-5}$ | $1.1 \times 10^{-4}$ | $1.6 \times 10^{-4}$ | 206 | 2.04 |
| 2. AHM | $1.24 \times 10^4$ | 0.90 | $5.8 \times 10^{-5}$ | $1.2 \times 10^{-4}$ | $1.6 \times 10^{-4}$ | 206 | 2.02 |
| 3. AHM | $1.21 \times 10^4$ | 0.50 | $5.8 \times 10^{-5}$ | $2.0 \times 10^{-4}$ | $1.6 \times 10^{-4}$ | 206 | 1.97 |
| 4. AMH (high pH) | $1.26 \times 10^4$ | 1.14 | $5. \times 10^{-5}$ | $8.9 \times 10^{-5}$ | $1.6 \times 10^{-4}$ | 206 | 2.05 |
| 5. ACID | $6.65 \times 10^3$ | 0.90 | $7.4 \times 10^{-5}$ | $1.4 \times 10^{-4}$ | $1.8 \times 10^{-4}$ | 214 | 1.18 |
| 6. ACID | $6.66 \times 10^3$ | 0.50 | $7.4 \times 10^{-5}$ | $3.4 \times 10^{-4}$ | $1.8 \times 10^{-4}$ | 216 | 1.16 |
| 7. ACID | $6.59 \times 10^3$ | 1.14 | $7.4 \times 10^{-5}$ | $9.4 \times 10^{-5}$ | $1.8 \times 10^{-4}$ | 212 | 1.17 |
| 8. AMH (no P) | $1.90 \times 10^4$ | 4.48 | $6.4 \times 10^{-5}$ | φ | $9.9 \times 10^{-5}$ | 205 | 1.87 |
| 9. ACID + | $1.05 \times 10^4$ | 0.38 | $7.4 \times 10^{-5}$ | $1.4 \times 10^{-4}$ | $1.8 \times 10^{-4}$ | 206 | 1.87 |

TABLE I-continued

| Solution No. & Designation | Extinct Coeff. liters cm · moles of Mo | pH | Moles Co liter | Moles P liter | Moles Mo liter | Max | A |
|---|---|---|---|---|---|---|---|
| NH$_4$NO$_3$ | | | | | | | |

In view of the data in Table I, the solutions prepared in accordance with the invention (Nos. 1, 2, 3, 4, and 9) have a pH less than about 1.2 and an extinction coefficient in the range of about $0.7 \times 10^4$ to about $1.8 \times 10^4$ liters/cm·moles of molybdenum. The solutions of the invention have a maximum absorbance of ultraviolet light greater than 1.3 at a wavelength in the range of about 200 to 250 nanometers.

Solutions Nos. 5 through 8 are distinguished from the solutions of the invention. Solutions Nos. 5, 6 and 7 have maximum extinction coefficients below about $0.7 \times 10^4$ liters/cm·moles of molybdenum, and solution No. 8 has a maximum extinction coefficient greater than $1.8 \times 10^4$ liters/cm·moles of molybdenum.

EXAMPLE II

Catalysts Nos. 1 through 4 are prepared, two in accordance with the invention (Catalysts Nos. 1 and 2), and each is tested under typical hydrodesulfurization conditions against a reference catalyst consisting of particles of a commercially available catalyst marketed by Armak Catalyst Division of Akzona, Inc. under the designation N-100. The N-100 catalyst has a 1/16 inch circular cross-sectional shape and has a nominal composition of 15.5 weight percent molybdenum components, calculated as MoO$_3$, 5.5 weight percent cobalt components, calculated as CoO, and the balance gamma alumina. The four catalysts compared against this commercial catalyst are prepared as follows:

Catalyst No. 1

The impregnating solution of the invention is prepared in the same manner as Solution No. 1 of Example I, except approximately one-half the portion is prepared. Ammonium heptamolybdate (36 grams) is placed in a beaker containing 50 ml of water and is partially dissolved by stirring for one minute. Undissolved ammonium helptamolybdate is dissolved by slowly stirring into the resulting solution 9.5 ml of 85 percent of phosphoric acid (H$_3$PO$_4$). Twenty-one (21) gm of cobalt nitrate Co(NO$_3$)$_2$.6H$_2$O is then dissolved in the resulting solution. After dissolution of the cobalt nitrate, an impregnant solution having a volume of 70 ml and a pH in the range of about 0.9 to about 1.0 is obtained.

Recycled gamma alumina support particles (125 grams), containing residual amounts of nickel, usually less than 0.2 calculated as NiO, and substantially identical in size and shape to those utilized in preparing a commercially available catalyst marketed by the American Cyanamid Company under the designation HC-F are wetted with 30 ml of distilled water at ambient temperature by slowly adding the water to a beaker containing the support particles. Due to exothermic heat generated by contact with water and alumina, the temperature of the particles reaches about 95° to 100° F., and as a result, some water evaporates while the remainder enters the pores of the alumina. After cooling in air to an ambient temperature, support particles are then contacted with the impregnant solution. Substantially all 70 ml of the impregnant solution is taken up by the support.

The impregnated composite is allowed to stand (age) for 45 minutes following which it is oven-dried at 110° C. and calcined at 1,200° F. for 1 hour in flowing air. The final catalyst contains 18.8 weight percent molybdenum components, calculated as MoO$_3$, 3.3 weight percent cobalt components, calculated as CoO, and 2.6 weight percent phosphorus components, calculated as P.

Catalyst No. 2

The impregnating solution of the invention is prepared in a similar manner as Solution No. 1 of Example I. Ammonium helptamolybdate (72 grams) is placed in a beaker containing 100 ml of water and is partially dissolved by stirring for one minute. Undissolved ammonium heptamolybdate is dissolved by slowly stirring into the resulting solution 19 ml of 85 percent phosphoric acid (H$_3$PO$_4$). Forty-two (42) grams of cobalt nitrate Co(NO$_3$)$_2$.6H$_2$O is then dissolved in the resulting solution. After dissolution of the cobalt nitrate, an impregnant solution having a volume of 175 ml and a pH in the range of about 0.9 to about 1.0 is obtained.

Recycled gamma alumina support particles (250) grams substantially identical to those utilized in Catalyst No. 1 are then contacted with the impregnant solution. Substantially all 175 ml of the impregnant solution is taken up by the support.

The impregnated composite is allowed to stand (age) for 45 minutes following which it is oven-dried at 110° C. and calcined at 1,200° F. for 1 hour in flowing air. After calcination, Catalyst No. 2 is determined to contain 19.7 weight percent molybdenum components, calculated as MoO$_3$, 3.5 weight percent cobalt components, calculated as CoO, and 2.5 weight percent phosphorus components, calculated as P.

Catalyst No. 3

The impregnating solution is prepared in the same manner as Solution No. 5 of Example I except relative amounts of the components are increased such that 2,000 ml instead of 175 ml is obtained. This catalyst is prepared as an example of a prior art catalyst taught in U.S. Pat. No. 3,840,472. Two hundred seventy ml of 85 percent H$_3$PO$_4$ is slowly stirred into 1,240 ml of water in a three liter beaker, the resulting solution is brought to a boil, and 730 gms of molybdenum trioxide (MoO$_3$) is stirred vigorously into the boiling solution. Then 250 grams of cobalt carbonate (CoCO$_3$) is added, with liberation of carbon dioxide (CO$_2$) during dissolution. A red translucent solution is obtained after heating and mixing for about two hours. After dissolution of the cobalt carbonate, an impregnant solution having a volume of 2,000 ml is obtained.

One hundred forty ml of the impregnant solution is utilized to impregnate 200 grams of recycled gamma alumina support particles identical to those described with respect to Catalyst No. 1. The impregnated composite is allowed to stand (age) for an hour and finished in the same way as Catalyst No. 1.

After calcination, Catalyst No. 3 is determined to contain 18.5 molybdenum components, calculated as MoO₃, 3.5 weight percent cobalt components, calculated as CoO, and 2.7 weight percent phosphorus components calculated as P.

Catalyst No. 4

This catalyst is prepared in a manner similar to that of Catalyst No. 1 of this Example except 21 grams of nickel nitrate (Ni(NO₃)₂.6H₂O) is added in the place of cobalt nitrate, the support particles are not pre-wet, and ammonium hydroxide (NH₄OH) is added to the impregnation solution such that the pH is in the range of about 1.2 to about 1.3. After calcination, Catalyst No. 4 is determined to contain 18.0 weight percent molybdenum components, calculated as MoO₃, 3.0 weight percent nickel components, calculated as NiO, and 3.0 weight percent phosphorus components, calculated as phosphorus, P.

Catalyst Nos. 1 through 4 and the reference catalyst are then each presulfided by contact with Kuwait vacuum gas oil (VGO) having been "spiked" with dimethyl sulfide to a 2.9 weight percent sulfur in the presence of hydrogen flowing at 2,000 standard cubic ft per barrel (SFC/B). The temperature during the presulfiding is initially at room temperature and is gradually increased hourly by 50° F. until 600° F. is reached, except that the temperature is held at 400° F. for four hours and at 600° F. for 2 hours. The feedstock is then switched to Light Arabian VGO, the properties of which are shown in Table II, at a 2.5 liquid hourly space velocity (LHSV) for 16 hours. The temperature is increased hourly by 20° F. to a temperature of 710° F.

TABLE II

| FEEDSTOCK PROPERTIES | |
|---|---|
| Feed Description | Light Arabian VGO |
| Gravity, °API | 22.4 |
| Sulfur, X-ray, Wt. % | 2.37 |
| Nitrogen, Wt. % | 0.078 |
| Pour Point, °F. | +95 |
| Carbon Residue on 10% Botts, D-189, Wt. % | 0.15 |
| ASTM D-1160 Distillation, °F. | |
| IBP/5 Vol. % | 701/763 |
| 10/20 | 772/788 |
| 30/40 | 808/830 |
| 50/60 | 860/885 |
| 70/80 | 910/942 |
| 90/95 | 970/995 |
| EP/Rec., Vol. % | 1,022/99.0 |

Catalyst Nos. 1 through 4 are then tested to determine their individual activities and temperature increase requirements (TIR), i.e., stability, for hydrodesulfurization in comparison to the reference N-100 catalyst. Catalyst Nos. 1 through 4 are each charged to a reactor and utilized at 710° F. to hydrodesulfurize a Light Arabian VGO feedstock having the characteristics shown in Table II under the following conditions: 640 psig total pressure, 2.5 LHSV, and hydrogen rate of 1,500 SCF/B. The feedstock is contacted with the described catalysts in a single-stage, single-pass system with once-through hydrogen such that the effluent sulfur concentration is maintained at 0.15 weight percent sulfur, equivalent to about 93.7 percent desulfurization.

Giving the reference N-100 catalyst an arbitrary activity of 100, relative activities of Catalyst Nos. 1 through 4 compared to the reference catalyst are determined by calculation and tabulated in Table III. These determinations are based on a comparison of the reaction rates for desulfurization obtained from the data of the experiment according to the following standard equation which assumes one and one-half order kinetics for desulfurization:

$$\text{Relative Desulfurization Activity} = \frac{(1/S_p)^{\frac{1}{2}} - (1/S_f)^{\frac{1}{2}}}{(1/S_{pr})^{\frac{1}{2}} - (1/S_{fr})^{\frac{1}{2}}} \times 100$$

where $S_{fr}$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

The temperature increase requirement (TIR) determinations are based upon calculation by a relatively simple formula. TIR may be determined by dividing the difference between two operating temperatures required to give a specific product on two given days in a run by run length (days).

TABLE III

| | Composition | | | | Stability |
|---|---|---|---|---|---|
| | MoO Wt. % | CoO or NiO Wt. % | P Wt. % | Activity | TIR °F./day |
| (N-100) | 15.5 | 5.5(CoO) | 0 | 100 | 1.17 |
| Cat 1 | 18.8 | 3.3(CoO) | 2.6 | 155 | .42 |
| Cat 2 | 19.7 | 3.5(CoO) | 2.5 | 155 | .42 |
| Cat 3 | 18.5 | 3.5(CoO) | 2.7 | 145 | 1.10 |
| Cat 4 | 18 | 3.0(NiO) | 3.0 | 125 | 1.40 |

The data summarized in Table III indicate that the temperature increase requirement (TIR) calculated in °F./day is substantially lower for the catalysts of the invention compared to the reference catalyst and Catalysts Nos. 3 and 4. The deactivation rates of the prior art and reference catalysts are approximately three times greater than is the case with catalysts of the invention. In addition to this supriority in stability, the catalysts of the invention also exhibit an improved activity compared to the prior art and reference catalysts.

EXAMPLE III

Two catalysts, one prepared in accordance with the invention (Catalyst No. 5) and one a prior art catalyst (No. 6) are tested against a reference catalyst marketed by the American Cyanamid Company under the designation of HDS-20. The HDS-20 catalyst contains 15.7 weight percent of molybdenum components, calculated as MoO₃, 4.8 weight percent of cobalt components, calculated as CoO, 1.2 weight percent of phosphorus components, calculated as P. The catalysts compared against this commercial catalyst are prepared as follows:

Catalyst No. 5

A catalyst of the invention is prepared in the same manner as Catalyst No. 2 of Example II except the weights and volumes are scaled up in order to produce approximately 10 pounds of finished catalyst.

After calcination, Catalyst No. 5 was determined to contain 19.2 weight percent of molybdenum components, calculated as MoO₃, 3.2 weight percent of cobalt components, calculated as CoO, and 2.6 weight percent of phosphorus components, calculated as P.

Catalyst No. 6

This catalyst is prepared in the same manner as Catalyst No. 3 of Example II except the weights and volumes are scaled up in order to produce approximately ten pounds of finished catalyst.

After calcination, Catalyst No. 6 is determined to contain 18.6 weight percent of molybdenum components, calculated as MoO$_3$, 2.9 weight percent of cobalt components, calculated as CoO, and 2.6 weight percent of phosphorus components, calculated as P.

Catalyst No. 5 is then tested against Catalyst No. 6 and the reference HDS-20 catalyst under the same conditions specified in Example II and with the same feedstock. Determinations as to hydrodesulfurization activity (compared to the N-100 catalyst of Example II having an arbitrary activity of 100) and stability (TIR) are then made in the same manner specified in Example II. Data derived from these determinations are summarized in Table IV.

TABLE IV

|  | Composition | | | | Stability |
| --- | --- | --- | --- | --- | --- |
|  | MoO$_3$ Wt. % | CoO Wt. % | P Wt. % | Activity | TIR °F./day |
| HDS-20 | 15.7 | 4.8 | 1.2 | 140 | 1.18 |
| Catalyst No. 5 | 19.2 | 3.2 | 2.6 | 164 | .18 |
| Catalyst No. 6 | 18.6 | 2.9 | 2.6 | 154 | .38 |

In view of the data in Table IV, the catalyst prepared in accordance with the invention is superior for desulfurization both in terms of activity and stability compared to prior art and reference catalysts. The catalyst of the invention (Catalyst No. 5) is more than twice as stable as prior art Catalyst No. 6 and is substantially more active. The commercially prepared reference catalyst exhibits six to seven times the deactivation rate and is much less active than the catalyst of the invention.

In view of the data in Tables III and IV, it is apparent that the catalyst prepared in accordance with this invention deactivates at a dramatically slower rate than comparative catalysts. As a consequence, the same degree of desulfurization can be obtained at lower temperatures and for a much longer time with the catalyst of the invention compared to other catalysts. Consequently, the activity difference between the catalyst of the invention and other catalysts is magnified with run length. Thus, for example, Catalyst No. 5 and the HDS-20 catalyst, according to the data of Table IV, have an initial activity differential of 24° F., but because of the lower stability of the HDS-20 catalyst, it can be seen that, after a substantial period of time in service, the difference in activity between the catalyst of the invention and the HDS-20 catalyst will increase substantially, far beyond the 24° F. differential of Table IV.

Although particular embodiments of the invention have been described, it will be understood that the invention is not limited thereto since many obvious modifications can be made, and it is intended to include within this invention any such modifications as will fall within the scope of the appended claims.

Having now described the invention, I claim:

1. A hydrocarbon conversion process comprising removing nitrogen from hydrocarbons boiling primarily above 100° F. which comprises contacting said hydrocarbons with hydrogen under denitrogenation conditions comprising a superatmospheric hydrogen partial pressure and a temperature of at least 400° F. in the presence of a catalytic composition which is prepared by the method comprising the steps of (1) impregnating support particles with an aqueous impregnating solution comprising dissolved cobalt, phosphorus, and at least 17 weight percent of Group VIB metal components, calculated as the trioxides, and wherein said dissolved phosphorus, calculated as P, is in a weight ratio to the Group VIB metal trioxide of about 0.05 to about 0.5, said solution having a pH less than 1.0 and is characterized by a maximum extinction coefficient in the ultraviolet spectrum of about 0.7×10$^4$ to about 1.8×10$^4$ liters/cm-moles of Group VIB metal, and (2) activating the impregnated support particles.

2. The process defined in claim 1 wherein said hydrocarbons comprise crude petroleum oils and crude synthetic oils.

3. The process defined in claim 1 wherein said hydrocarbons are selected from the group consisting of lubricating oils, waxes, residua fractions, kerosene, solvent naphthas, fuel oils, shale oils, diesel fuels, jet fuels, heavy naphthas, gas oils, vacuum gas oils, light naphthas, cycle oils from cracking operations, coker distillates, cracked gasoline and decant oils.

4. The process defined in claim 1 wherein said pressure is in the range from about 20 psig to about 600 psig, and said hydrogen is added to said hydrocarbons at a rate from about 25 to about 20,000 scf/bbl.

5. The process defined in claim 1 further comprising hydrogenation of said hydrocarbons.

6. The process defined in claim 1 wherein said aqueous solution comprises at least about one weight percent of said cobalt components, calculated as CoO, said Group VIB metal components comprise ammonium heptamolybdate and contains at least about 17 weight percent of molybdenum components, calculated as MoO$_3$, and at least about 0.5 weight percent of said phosphorus components is present in a form comprising orthophosphoric acid.

7. The process defined in claim 1 wherein said support particles comprise gamma alumina and have a pore volume from about 0.6 to about 1.4 cc/gram and have a surface area of 100 to about 280 m$^2$/gram.

8. The process defined in claim 1 wherein said catalytic composition contains about 5 to about 50 weight percent of Group VIB metal components, calculated as the trioxides, from about one to about 10 weight percent of cobalt components, calculated as cobalt oxide, and at least about one weight percent phosphorus, calculated as phosphorus.

9. A process for the removal of nitrogen from a hydrocarbon feedstock, boiling primarily above 100° F., which comprises contacting said feedstock with hydrogen under denitrogenation conditions including a superatmospheric pressure and a hydrogen flow rate in the range from about 25 SCF/bbl to about 20,000 SCF/bbl in the presence of a catalytic composition which is prepared by the method comprising the steps of (1) impregnating support particles with an aqueous solution comprising dissolved cobalt, phosphorus, at least 17 weight percent of Group VIB metal components, calculated as the trioxides, and ammonium ions with a molar concentration greater than 1.5, said solution having a pH less than 1.0 and wherein said dissolved phosphorus, calculated as P, is in a weight ratio to the Group VIB metal trioxide of about 0.01 to 0.5, and (2) activating the impregnated support particles.

10. The process definded in claim 9 wherein said hydrocarbon feedstock boils from about 100° F. to about 1,300° F.

11. The process defined in claim 9 wherein said hydrocarbon feedstock is selected from the group consisting of residua fractions, gas oils, vacuum gas oils, heavy naphthas, light naphthas, fuel oils, crude shale oils, cycle oils from cracking operations, coker distillates and decant oils.

12. The process defined in claim 9 wherein said conditions include a temperature from about 400° F. to about 900° F., a pressure from about 200 psig to about 5,000 psig and a hydrogen rate of at least 50 scf/bbl.

13. The process defined in claim 9 wherein said support particles comprise gamma alumina and have a pore volume from about 0.6 to about 1.4 cc/gram, and have a surface area of 100 to about 280 m²/gram.

14. The process defined in claim 9 wherein said catalytic composition contains about 17 to about 30 weight percent of Group VIB metal components, calculated as the trioxides, about one to about 10 weight percent of cobalt components, calculated as cobalt oxide, and about one to about 10 weight percent of phosphorus, calculated as phosphorus.

15. The process defined in claim 9 wherein said aqueous solution comprises at least about one weight percent of said cobalt components, calculated as CoO, said Group VIB metal components comprise ammonium heptamolybdate and contains at least about 17 weight percent of molybdenum components, calculated as $MoO_3$, and at least about 0.5 weight percent of said phosphorus components is present in a form comprising orthophosphoric acid.

16. A denitrogenation of a hydrocarbon feedstock which comprises contacting said feedstock with hydrogen under denitrogenation including a pressure between about 20 psig and about 6,000 psig, a hydrogen flow rate in the range from about 25 SCF/bbl to about 20,000 SCF/bbl, and a liquid hourly space velocity greater than about 0.05, in the presence of a catalytic composition prepared by the method comprising the steps of (1) impregnating alumina-containing support particles with an aqueous impregnating solution comprising (a) at least one molybdenum compound selected from the group consisting of ammonium heptamolybdate, ammonium phosphomolybdate and ammonium dimolybdate, (b) cobalt nitrate, and (c) orthophosphoric acid, and wherein said solution contains dissolved phosphorus, calculated as P, in a weight ratio to molybdenum trioxide of about 0.05 to about 0.2, said solution containing at least about 17 weight percent molybdenum components, calculated as $MoO_3$, said solution having a pH less than 1.0 and being characterized by an ultraviolet spectrum having a maximum absorbance in the range of about 1.3 to about 2.3 at a wavelength in the range of about 200 to about 210 nanometers when said solution is diluted such that the molar concentration of molybdenum (calculated as Mo) is in the range of about $0.7 \times 10^{-4}$ to about $3.3 \times 10^{-4}$, (2) aging said impregnated support particles, and (3) thermally activating said aged support particles.

17. A hydrocarbon conversion process comprising removing metals from hydrocarbons boiling primarily about 100° F. by contacting said hydrocarbons with hydrogen under demetallizing conditions comprising a superatomospheric hydrogen partial pressure and a temperature of at least 400° F. in the presence of a catalytic composition which is prepared by the method comprising the steps of (1) impregnating support particles with an aqueous impregnating solution comprising dissolved cobalt, phosphorus, and at least 17 weight percent of Group VIB metal components, calculated as the trioxides, and wherein said dissolved phosphorus, calculated as P, is in a weight ratio to the Group VIB metal trioxide of about 0.05 to about 0.5, said solution having a pH less than 1.0 and is characterized by a maximum extinction coefficient in the ultraviolet spectrum of about $0.7 \times 10^4$ to about $1.8 \times 10^4$ liters/cm-moles of Group VIB metal, and (2) activating the impregnated support particles.

18. The process defined in claim 17 wherein said hydrocarbons are selected from the group consisting of lubricating oils, residua fractions, fuel oils, shale oils, heavy naphthas, gas oils, vacuum gas oils, coker distillates, and decant oils.

19. The process defined in claim 17 wherein said pressure is in the range from about 20 psig to about 6000 psig, and said hydrogen is added to said hydrocarbons at a rate from about 25 to about 20,000 scf/bbl.

20. The process defined in claim 17 wherein said aqueous solution comprises at least about one weight percent of said cobalt components, calculated as CoO, said Group VIB metal components comprise ammonium heptamolybdate and contains at least about 17 weight percent of molybdenum components, calculated as $MoO_3$, and at least about 0.5 weight percent of said phosphorus components is present in a form comprising orthophosphoric acid.

21. The process defined in claim 17 wherein said catalytic composition contains about 5 to about 50 weight percent of Group VIB metal components, calculated as the trioxides, from about one to about 10 weight percent of cobalt components, calculated as cobalt oxide, and at least about one weight percent phosphorus, calculated as phosphorus.

22. A process for removing metals from a hydrocarbon feedstock boiling primarily above 100° F. by contacting said feedstock with hydrogen under demetallizing conditions including a superatmospheric pressure and a hydrogen flow rate in the range from about 25 scf/bbl to about 20,000 scf/bbl in the presence of a catalytic composition which is prepared by the method comprising the steps of (1) impregnating support particles with an aqueous solution comprising dissolved cobalt, phosphorus, at least 17 weight percent of Group VIB metal components, calculated as the trioxides, and ammonium ions with a molar concentration greater than 1.5, said solution having a pH less than 1.0 and wherein said dissolved phosphorus, calculated as P, is in a weight ratio to the Group VIB metal trioxide of about 0.01 to 0.5, and (2) activating the impregnated support particles.

23. The process defined in claim 22 wherein said hydrocarbon feedstock is selected from the group consisting of residua fractions, gas oils, vacuum gas oils, heavy napthas, light naphthas, fuel oils, crude shale oil, coker distillates and decant oils.

24. The process defined in claim 22 wherein said conditions include a temperature from about 400° F. to about 900° F., a pressure from about 200 psig to about 5,000 psig and a hydrogen rate of at least 50 scf/bbl.

25. The process defined in claim 22 wherein said catalytic composition contains about 17 to about 30 weight percent of Group VIB metal components, calculated as the trioxides, about one to about 10 weight percent cobalt components, calculated as cobalt oxide, and about one to about 10 weight percent of phosphorus, calculated as phosphorus.

26. The process defined in claim 22 wherein said aqueous solution comprises at least about one weight percent of said cobalt components, calculated as CoO, said Group VIB metal components comprise ammonium heptamolybdate and contains at least about 17 weight percent of molybdenum components, calculated as MoO₃, and at least about 0.5 weight percent of said phosphorus is present in a form comprising orthophosphoric acid.

27. A process for the demetallization of a hydrocarbon feedstock comprising contacting said feedstock with hydrogen under demetallizing conditions including a pressure between about 20 psig and about 6,000 psig, a hydrogen flow rate in the range from about 25 scf/bbl to about 20,000 scf/bbl, and a liquid hourly space velocity greater than about 0.05, in the presence of a catalytic composition prepared by the method comprising the steps of (1) impregnating alumina-containing support particles with an aqueous impregnating solution comprising (a) at least one molybdenum compound selected from the group consisting of ammonium heptamolybdate, ammonium phosphomolybdate and ammonium dimolybdate, (b) cobalt nitrate, and (c) orthophosphoric acid, and wherein said solution contains dissolved phosphorus, calculated as P, in a weight ratio to molybdenum trioxide of about 0.05 to about 0.2, said solution containing at least about 17 weight percent molybdenum components, calculated as MoO₃, said solution having a pH less than 1.0 and being characterized by an ultraviolet spectrum having a maximum absorbance in the range of about 1.3 to about 2.3 at a wavelength in the range of about 200 to about 210 nanometers when said solution is diluted such that the molar concentration of molybdenum (calculated as Mo) is in the range of about $0.7 \times 10^{-4}$ to about $3.3 \times 10^{-4}$, (2) aging said impregnated support particles, and (3) thermally activating said aged support particles.

28. A hydrocracking process comprising contacting hydrocarbons boiling primarily above 100° F. and hydrogen under hydrocracking conditions comprising a superatmospheric hydrogen partial pressure and a temperature of at least 400° F. with a catalytic composition prepared by the method comprising the steps of (1) impregnating support particles with an aqueous impregnating solution comprising dissolved cobalt, phosphorus, and at least 17 weight percent of Group VIB metal components, calculated as the trioxides, and wherein said dissolved phosphorus, calculated as P, is in a weight ratio to the Group VIB metal trioxide of abut 0.05 to 0.5, said solution having a pH less than about 1.0 and is characterized by a maximum extinction coefficient in the ultraviolet spectrum of about $0.7 \times 10^4$ to about $1.8 \times 10^4$ liters/cm·moles of Group VIB metal, and (2) activating the impregnated support particles.

29. The process defined in claim 28 wherein said hydrocarbons are selected from the group consisting of lubricating oils, waxes, residua fractions, fuel oils, shale oils, diesel fuels, gas oils, vacuum gas oils, coker distillates, and decant oils.

30. The process defined in claim 28 wherein said pressure is in the range from about 20 psig to about 6000 psig, and said hydrogen is added to said hydrocarbons at a rate from about 25 to about 20,000 scf/bbl.

31. The process defined in claim 28 wherein said aqueous solution comprises at least about one weight percent of said cobalt components, calculated as CoO, said Group VIB metal components comprise ammonium heptamolybdate and contains at least about 17 weight percent of molybdenum components, calculated as MoO₃, and at least about 0.5 weight percent of said phosphorus is present in a form comprising orthophosphoric acid.

32. The process defined in claim 28 wherein said catalytic composition contains about 5 to about 50 weight percent of Group VIB metal components, calculated as the trioxides, from about one to about 10 weight percent of cobalt components, calculated as cobalt oxide, and at least about one weight percent phosphorus, calculated as phosphorus.

33. A hydrocarbon cracking process comprising contacting hydrocarbons boiling primarily above 100° F. under cracking conditions comprising a superatmospheric pressure and a temperature of at least 400° F. with a catalytic composition prepared by the method comprising the steps of (1) impregnating support particles with the aqueous impregnating solution comprising dissolved cobalt, phosphorus, and at least 17 weight percent of Group VIB metal components, calculated as the trioxides, and wherein said dissolved phosphorus, calculated as P, is in a weight ratio to the Group VIB metal trioxide of about 0.05 to about 0.5, said solution having a pH less than 1.0 and is characterized by a maximum extinction coefficient in the ultraviolet spectrum of about $0.7 \times 10^4$ to about $1.8 \times 10^4$ liters/cm·moles of Group VIB metal, and (2) activating the impregnated support particles.

34. The process defined in claim 33 wherein said hydrocarbons are selected from the group consisting of lubricating oils, waxes, residua fractions, fuel oils, shale oils, diesel fuels, jet fuels, gas oils, vacuum gas oils, coker distillates, and decant oils.

35. The process defined in claim 33 wherein said pressure is in the range from about 20 psig to about 6000 psig.

36. The process defined in claim 33 wherein said aqueous solution comprises at least about one weight percent of said cobalt components, calculated as CoO, said Group VIB metal components comprise ammonium heptamolybdate and contains at least about 17 weight percent of molybdenum components, calculated as MoO₃, and at least about 0.5 weight percent of said phosphorus is present in a form comprising orthophosphoric acid.

37. The process defined in claim 33 wherein said catalytic composition contains about 5 to about 50 weight percent of Group VIB metal components, calculated as the trioxides, from about one to about 10 weight percent of cobalt components, calculated as cobalt oxide, and at least about one weight percent phosphorus, calculated as phosphorus.

* * * * *

UNITED STATES PATENT AND TRADEMARK OFFICE
CERTIFICATE OF CORRECTION

PATENT NO. : 4,627,910
DATED : 12/09/86
INVENTOR(S) : W. S. Millman

It is certified that error appears in the above-identified patent and that said Letters Patent are hereby corrected as shown below:

Col. 16, Claim 4, line 21, delete "600" and insert therefor -6000--.

Signed and Sealed this

Seventeenth Day of November, 1987

Attest:

DONALD J. QUIGG

*Attesting Officer*  *Commissioner of Patents and Trademarks*